United States Patent
Lee (10) Patent No.: US 8,799,497 B2
(45) Date of Patent: Aug. 5, 2014

(54) HEADEND SYSTEM BASED ON IP NETWORK, METHOD OF OPERATING THE HEADEND SYSTEM, AND QAM PRE-PROCESSOR

(75) Inventor: Ho-Sook Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 686 days.

(21) Appl. No.: 12/906,555

(22) Filed: Oct. 18, 2010

(65) Prior Publication Data

US 2011/0153859 A1   Jun. 23, 2011

(30) Foreign Application Priority Data

Dec. 21, 2009   (KR) .................. 10-2009-0127981

(51) Int. Cl.
*H04L 1/00* (2006.01)
(52) U.S. Cl.
USPC .................................................. 709/231
(58) Field of Classification Search
USPC ................... 370/390, 206; 725/110
See application file for complete search history.

(56) References Cited

U.S. PATENT DOCUMENTS

| | | | | |
|---|---|---|---|---|
| 4,300,229 A * | 11/1981 | Hirosaki | ........................ | 370/206 |
| 5,859,671 A | 1/1999 | Kim | | |
| 8,254,385 B2 * | 8/2012 | Field | ............................. | 370/390 |
| 2010/0083329 A1 * | 4/2010 | Joyce et al. | ................... | 725/110 |

FOREIGN PATENT DOCUMENTS

| | | |
|---|---|---|
| EP | 1392015 A1 | 2/2004 |
| KR | 1020060092388 | 8/2006 |
| KR | 1020090060529 | 6/2009 |
| KR | 1020100071493 | 6/2010 |

* cited by examiner

*Primary Examiner* — Yemane Mesfin
*Assistant Examiner* — Derrick V Rose
(74) *Attorney, Agent, or Firm* — Nelson Mullins Riley & Scarborough LLP; Anthony A. Laurentano, Esq.

(57) ABSTRACT

Provided is an IP network-based headend system. The headend system may obtain service flow information pre-registered in a subscriber modem device, may transmit, to a service supply server connected based on an IP network, the pre-registered service flow information and the network protocol packet, may determine a data reception route determined by the service supply server, may receive, from the service supply server, a video data stream to perform data processing, may receive data processed video data stream, and may transmit the data processed video data stream to the subscriber modem device based on the pre-registered service flow information.

12 Claims, 5 Drawing Sheets

HEADEND SYSTEM BASED ON IP NETWORK, METHOD OF OPERATING THE HEADEND SYSTEM, AND QAM PRE-PROCESSOR

CROSS-REFERENCE TO RELATED APPLICATION

This application claims the benefit of Korean Patent Application No. 10-2009-0127981, filed on Dec. 21, 2009, in the Korean Intellectual Property Office, the disclosure of which is incorporated herein by reference.

BACKGROUND

1. Field of the Invention

The present invention relates to an Internet Protocol (IP) network-based headend system and an operating method thereof, and relates to a quadrature amplitude modulation (QAM) pre-processing device.

2. Description of the Related Art

As users are constantly changed in a broadcast communication system market, a broadcast service provider attempts to provide various services to cope with the changes of the users. As one of the attempts, the broadcast service provider may provide a broadcast service to a user and may also provide an interactive service that provides broadcast service to the user in response to a request of the user.

To provide the interactive service, an Internet Protocol (IP) network-based wireless communication system using a multicasting scheme has been introduced. Specifically, a system that equips a Data Over Cable Service Interface Specification (DOCSIS) standard-based cable modem termination device in a headend side to transmit a video data stream to a device in a receiving side has been developed. However, the video data stream has a feature of a real-time transmission and has a high capacity and thus, a plurality of cable modem termination devices may need to be included in the headend side to process the video data stream.

In a conventional headend system, a headend side is mainly configured by a quadrature amplitude modulator and thus, the quadrature amplitude modulator may need to be changed with the plurality of cable modem terminal devices. However, the cable modem terminal device is expensive, and cost may also be expended for implementation and thus, a financial burden may be incurred due to the changing of the quadrature amplitude modulator with the plurality of cable modem terminal devices.

SUMMARY

An aspect of the present invention provides a method of determining a reception route of a video data stream as a quadrature amplitude modulation (QAM) pre-processing device, and performing data processing in the QAM pre-processing device and thus, may process a high capacity video data stream without a plurality of cable modem termination device.

According to an aspect of the present invention, there is provided an Internet Protocol (IP) network-based headend system, and the system includes a cable modem termination device to receive a network protocol packet from a subscriber modem device, and to analyze the received network protocol packet to obtain service flow information pre-registered in the subscriber modem device, a quadrature amplitude modulation (QAM) pre-processing device to transmit the obtained pre-registered service flow information and the received network protocol packet to a service supply server that is connected based on an IP network, to be determined, by the service supply server, as a data reception route, and to receive a video data stream from the service supply server to perform data processing, and a QAM post-processing device to receive the data processed video data stream to transmit to the subscriber modem device based on the pre-registered service flow information.

According to an aspect of the present invention, there is provided a QAM pre-processing device, and the device includes a first receiving unit to receive, from a cable modem termination device, service flow information pre-registered in a subscriber modem device and a network protocol packet, a first transmitting unit to transmit the received network protocol packet to a service supply server connected based on an IP network, a second receiving unit being determined, by the service supply server, as a data reception route, to receive a video data stream, a controller to perform data processing of the received video data stream, and a second transmitting unit to transmit the data processed video data stream to the subscriber modem device.

According to an aspect of the present invention, there is provided an IP network-based headend system operating method, and the method includes receiving a network protocol packet from a subscriber modem device, and analyzing the received network protocol packet to obtain service flow information pre-registered in the subscriber modem device, transmitting the pre-registered service flow information and the network protocol packet to a service supply server that is connected based on an IP network, and enabling the IP network-based headend system to be determined as a data reception route, performing data processing when a video data stream is received from the service supply server, and transmitting the data processed video data stream to the subscriber modem device based on the pre-registered service flow information when the data processed video data stream is received.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
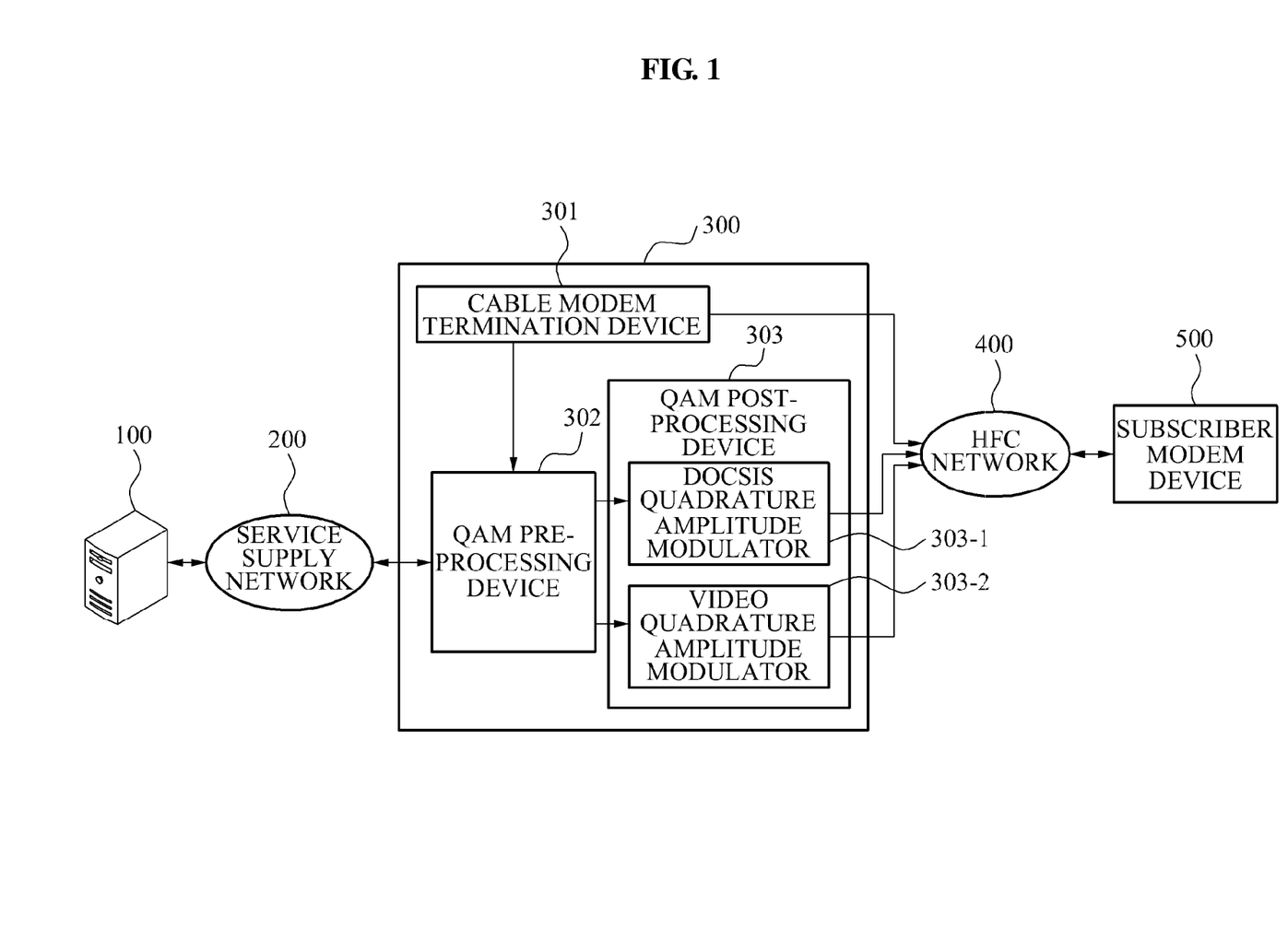
FIG. 1 is a diagram illustrating a broadcast communication system according to an embodiment of the present invention.

FIG. 1 illustrates a broadcast communication system according to an embodiment of the present invention. Referring to FIG. 1, the broadcast communication system may include a service supply server 100, a service supply network 200, a headend system 300, a hybrid fiber-coaxial (HFC) network 400, and a subscriber modem device 500. In this case, the service supply network 200 and the headend system 300 may be interoperated based on an IP network, and the headend system 300 and the subscriber modem device 500 may have a wireless communication structure and may be interoperated based on the HFC network 400.

In the broadcast system, the service supply server 100 may provide a video data stream requested via the subscriber modem device 500, and may transmit the video data stream to the headend system 300 via the service supply network 200 to provide the video data stream to the subscriber modem device 500. In this case, the headend system 300 may perform data processing of the received video data stream and may transmit the data processed video data stream to the subscriber modem device 500.

Elements mainly configuring the headend system 300 that is associated with data processing, and a function of each element will be described. Referring to FIG. 1, the headend system 300 may use a Data Over Cable Service Interface Specification (DOCSIS)-based transmission scheme to transmit data from the HFC network 400 to the subscriber modem device 500.

The headend system 300 may include a cable modem termination device 301, a quadrature amplitude modulation (QAM) pre-processing device 302, and a QAM post-processing device 303. When a video data stream is received via the service supply network 200, the headend system 300 of FIG. 1 may perform data processing of the received video data stream in the QAM pre-processing device 302 as opposed to in the cable modem termination device 301. The video data stream data processed in the QAM pre-processing device 302 may be transmitted to the QAM post-processing device 303 to be transmitted to the subscriber modem device 500.

When a broadcast service request is received from the subscriber modem device 500, the cable modem termination device 301 may request a network protocol packet from the subscriber modem device 500. Therefore, the subscriber modem device 500 may transmit the network protocol packet via an uplink channel in response to the request. In this case, the network protocol packet may be an Internet Group Management Protocol (IGMP) join message packet or may be an Address Resolution Protocol (ARP) packet. Also, the subscriber modem device 500 may transmit the network protocol packet based on the DOCSIS-based transmission scheme.

When the network protocol packet is received, the cable modem termination device 301 may analyze the network protocol packet to obtain service flow information pre-registered in the subscriber modem device 500. The pre-registered service flow information in the subscriber modem device 500 may be referred to as first service flow information. Although a single subscriber modem device is illustrated in FIG. 1, a plurality of subscriber modem devices may be interoperated via the HFC network 400 in a real system. Therefore, a plurality of first service flow information may be obtained based on the plurality of subscriber modem devices.

The cable modem termination device 301 may compare the first service flow information with service flow information pre-registered in the cable modem termination device 301 to determine whether the first service flow information is identical to service flow information pre-registered in the cable modem termination device 301. The pre-registered service flow information pre-registered in the cable modem termination device 301 may be referred to as second service flow information. In this case, a plurality of second service flow information corresponding to a plurality of subscriber modem devices may be registered in the cable modem termination device 301. The cable modem termination device 301 may determine whether second service flow information identical to the first service flow information exists among the plurality second service flow information. When the second service flow information identical to the first service flow information exists, the cable modem termination device 301 may transmit the first service flow information and the network protocol packet to the QAM pre-processing device 302.

When the second service flow information identical to the first service flow information does not exist, the cable modem termination device 301 may newly register the first service flow information with respect to the subscriber modem device 500, and may report the new registration to the subscriber modem device 500 via a downlink channel. When the new registration is completed, the cable modem termination device 301 may transmit the first service flow information and the network protocol packet to the QAM pre-processing device 302. In this case, the cable modem termination device 301 may be connected to the QAM pre-processing device 302 based on at least one of an Inter Process Communication (IPC) communication scheme and/or a Remote Procedure Call (RPC) communication scheme.

The QAM pre-processing device 302 may be a module-type transmission device that may be operated depending on the cable modem terminal device 301 and thus, may be controlled by the cable modem termination device 301. Also, the QAM pre-processing device 302 may be a passive peripheral device that may perform a portion of a service flow function with respect to the downlink channel, which is performed in the cable modem termination device 301.

When the first service flow information with respect to the subscriber modem device and the network protocol packet are received, the QAM pre-processing device 302 compares the first service flow information with service flow information pre-registered in the QAM pre-processing device 302 to determine whether the first service flow information is identical to the service flow information pre-registered in the QAM pre-processing device 302. The pre-registered service flow information in the QAM may be referred to as third service flow information. In this case, a plurality of third service flow information corresponding to a plurality of subscriber modem devices may be registered in the QAM pre-processing device. The QAM pre-processing device 302 may determine whether third service flow information identical to the first service flow information exists among the plurality of third service flow information, and may terminate an operation of the QAM pre-processing device 302 when the third service flow information identical to the first service flow information does not exist.

Conversely, when the third service flow information identical to the first service flow information exists, the network protocol packet may be transmitted to the service supply server 100 via the service supply network 200. The service supply server 100 may determine, as a data communication route, the QAM prep-processing device 302 that transmits the network protocol packet to the service supply server 100. A route of data transmitted from the service supply server 100 to the headend system 300 may be determined to be transmitted to the QAM pre-processing device 302.

When a video data stream is received via the service supply server 100, the QAM pre-processing device 302 may divide the video data stream based on a first service flow unit. When a plurality of subscriber modem devices exists in a system, a plurality of first service flows may exists. Therefore, the video data stream may need to be divided based on the first service flow unit?

Each divided video data stream may be data-processed. In this case, a header may be added to each divided video data stream and a transmission frequency channel is determined with respect to each divided video data stream to perform scheduling and thus, the data-processing may be performed. When the data-processing is completed, the QAM pre-processing device 302 may transmit the data processed video data stream to a QAM post-processing device 303.

The QAM post-processing device 303 may convert the data processed video data stream and transmit the converted video data stream to the subscriber, and may include a DOCSIS quadrature amplitude modulator 303-1 and a video quadrature amplitude modulator 303-2.

The DOCSIS quadrature amplitude modulator 303-1 may convert the video data stream into a DOCSIS packet and may transmit the DOCSIS packet to the subscriber modem device 500 based on the first service flow information.

The QAM pre-processing device 303 may convert the video data stream into a Moving Pictures Experts Group 2 transport stream (MPEG-2 TS) format and may transmit "MPEG-2 TS packets to the subscriber modem device 500 based on the first service flow information.

Whether the video data stream is to be converted by the DOCSIS quadrature amplitude modulator 303-1 or by the video quadrature amplitude modulator 303-2 may be determined based on the pre-registered first service flow by the QAM post-processing device 303. For example, when the first service flow is "A" and a flow of the DOCSIS quadrature amplitude modulator 303-1 is included in "A", the video data stream may be transmitted to the DOCSIS quadrature amplitude modulator 303-1 and may be converted into a DOCSIS packet.

Conversely, when the first service flow is "B" and a flow of the video quadrature amplitude modulator 303-2 is included in "B", the video data stream may be transmitted to the video quadrature amplitude modulator 303-2 and may be converted into an MPEG-2 TS format. Each of the DOCSIS quadrature amplitude modulator 303-1 and the video quadrature amplitude modulator 303-2 may transmit a corresponding converted video data stream to the subscriber modem device 500.

The QAM pre-processing device 302 of FIG. 1 may receive the video data stream and perform data processing of the received video data stream and thus, may perform a portion of a service flow function with respect to the downlink channel, which is performed in the cable modem termination device 301. Therefore, the headend system 300 may process a high capacity of video data stream using the QAM pre-processing device 302 and thus, may only include the single cable modem termination device 301.

Figure 2:
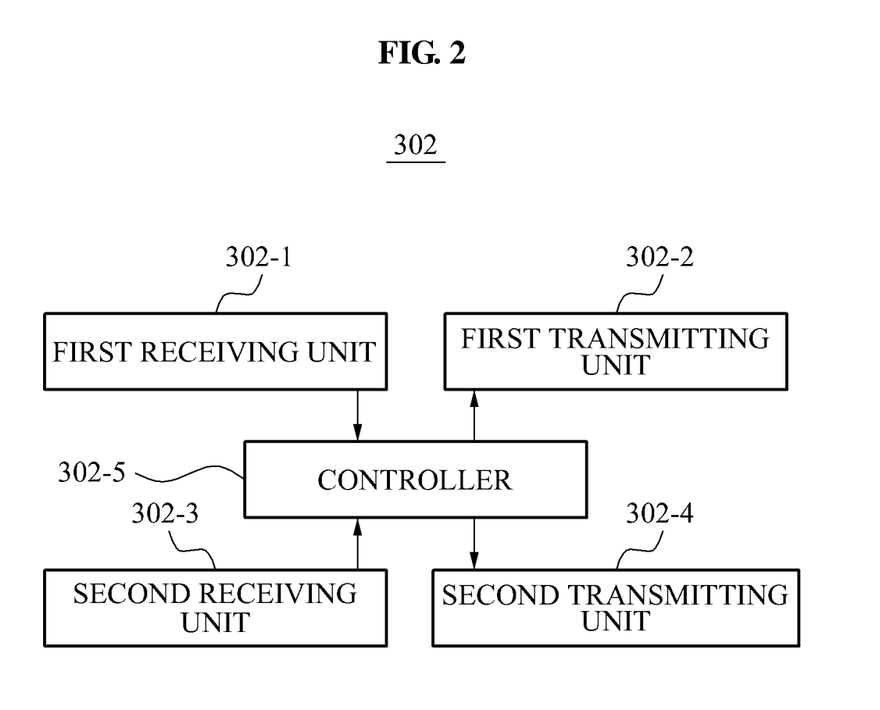
FIG. 2 is a block diagram illustrating a configuration of a QAM pre-processing device according to an embodiment of the present invention.

FIG. 2 illustrates a configuration of the QAM pre-processing device 302 according to an embodiment of the present invention. The QAM pre-processing device 302 of FIG. 2 may be included in the headend system 300 of FIG. 1, and may process a video data stream transmitted to the headend system 300. Therefore, the video data stream may be transmitted to the subscriber modem device 500 without using the cable modem termination device 301 and thus, data processing and data transmission may be effectively performed.

The QAM pre-processing device 302 may include a first receiving unit 302-1, a first transmitting unit 302-2, a second receiving unit 302-3, a second transmitting unit 302-4, and a controller 302-5.

The first receiving unit 302-1 may receive, from the cable modem termination device 301, first service flow information pre-registered in the subscriber modem device 500 and a network protocol packet. The first receiving unit 302-1 may receive a control signal of the cable modem termination device 301. In this case, the control signal may be a transmission control command commanding to transmit the first service flow information pre-registered in the subscriber modem device 500 and the network protocol packet to the service supply network 200, and may be a data-processing control command instructing to perform data processing.

The QAM pre-processing device 302 may perform one-way communication that may only receive data or a signal from the cable modem termination device 301 and thus, may only include a communication device for reception with respect to the cable modem termination device 301, namely, the first receiving unit. The QAM pre-processing device 302 is a passive peripheral device that is controlled by the cable modem termination device 301. Although the QAM pre-processing device 302 may further include a communication device for transmitting a signal to the cable modem termination device 301, the communication device for the signal transmission may only transmit a predetermined response signal to the cable modem termination device 301.

The first transmitting unit 302-2 may transmit data or a signal to the service supply network 200. The second receiving unit 302-3 may receive data or a signal from the service supply network 200.

The controller 302-5 may control overall operations of the QAM pre-processing device 302. Specifically, when the first service flow information and the network protocol packet are received through the first receiving unit 302-1, the controller 302-5 may compare the first service flow information with third service flow information pre-registered in the QAM pre-processing device 302.

When third service flow information identical to the first service flow information exists, the controller 302-5 may control the first transmitting unit 302-2 to transmit the network protocol packet to the service supply network 200.

When the third service flow identical to the first service flow information does not exist, the controller 302-5 may terminate all operations of the QAM pre-processing device 302. The QAM pre-processing device 302 may not directly register a service flow. The cable modem termination device 301 may control the QAM pre-processing device 302 to register the service flow in the QAM pre-processing device 302. Therefore, when the first service flow information pre-registered in the subscriber modem device 500 is not pre-registered in the QAM pre-processing device 302, the QAM pre-processing device 302 may no longer perform the operations.

The QAM pre-processing device 302 may be determined as a data reception route by transmitting the network protocol packet to the service supply server 100 via the service supply network 200. When the network protocol packet is received from the QAM pre-processing device 302, the service supply server 100 may determine the QAM pre-processing device 302 as a data transmission route. Therefore, the second receiving unit 302-3 may receive the video data stream from the service supply server 100.

The controller 302-5 may process the video data stream received through the second receiving unit 302-3. Specifically, the controller 302-5 may divide the video data steam based on a first service flow unit, may add a header to each divided video data stream, and may determine a transmission frequency channel with respect to each divided video data stream to perform scheduling. The second transmitting unit 302-3 may be controlled to transmit, to the QAM post-processing device 303, the data processed video data stream based on the first service flow unit.

As described with reference to FIG. 2, the video data stream provided to the headend system 300 from the service supply server 100 may be data-processed in the QAM pre-processing device 302 without using the cable modem termination device 301 and thus, data processing and data transmission may be effectively performed without an additional load from data processing and data transmission of the cable modem termination device 301.

Figure 3:
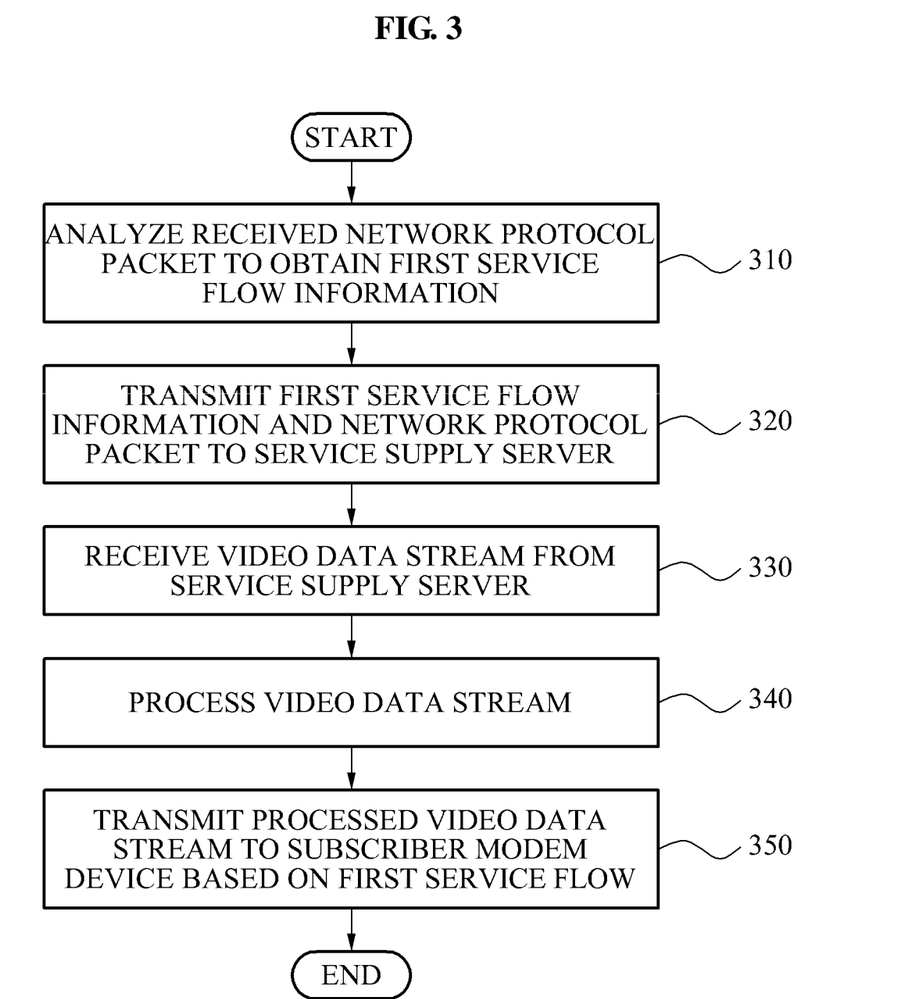
FIG. 3 is a flowchart illustrating an operating method of a headend system according to an embodiment of the present invention.

FIG. 3 illustrates an operating method of a headend system 300 according to an embodiment of the present invention. Referring to FIG. 3, the headend system 300 analyzes a network protocol packet received from the subscriber modem apparatus 500 to obtain pre-registered first service flow information in operation 310. Operation 310 may be performed in the cable modem termination device 301 of the headend system 300.

Subsequently, the headend system 300 transmits the first service flow information and the network protocol packet to the service supply server 100 in operation 320. Operation 320 may be performed in the QAM pre-processing device 302, and a data reception route may be determined by the service supply server 100 through operation 320.

The headend system 300 receives a video data stream from the service supply server 100 in operation 330. The headend system 300 may process the video data stream in operation 340, and may transmit the processed video data stream to the subscriber modem device 500 based on the pre-registered first service flow in operation 350. In this case, operations 330 and 340 may be performed in the QAM pre-processing device 302 of the headend system 300, and operation 350 may be performed in the QAM post-processing device 303.

The QAM post-processing device 303 may convert the processed video data stream and may transmit the converted video data stream to the subscriber modem device 500. The QAM post-processing device 303 may convert the video data stream into a DOCSIS packet or into an MPEG-2 TS format, and may transmit the DOCSIS packet or the MPEG-2 TS format to the subscriber modem device 500.

Figure 4:
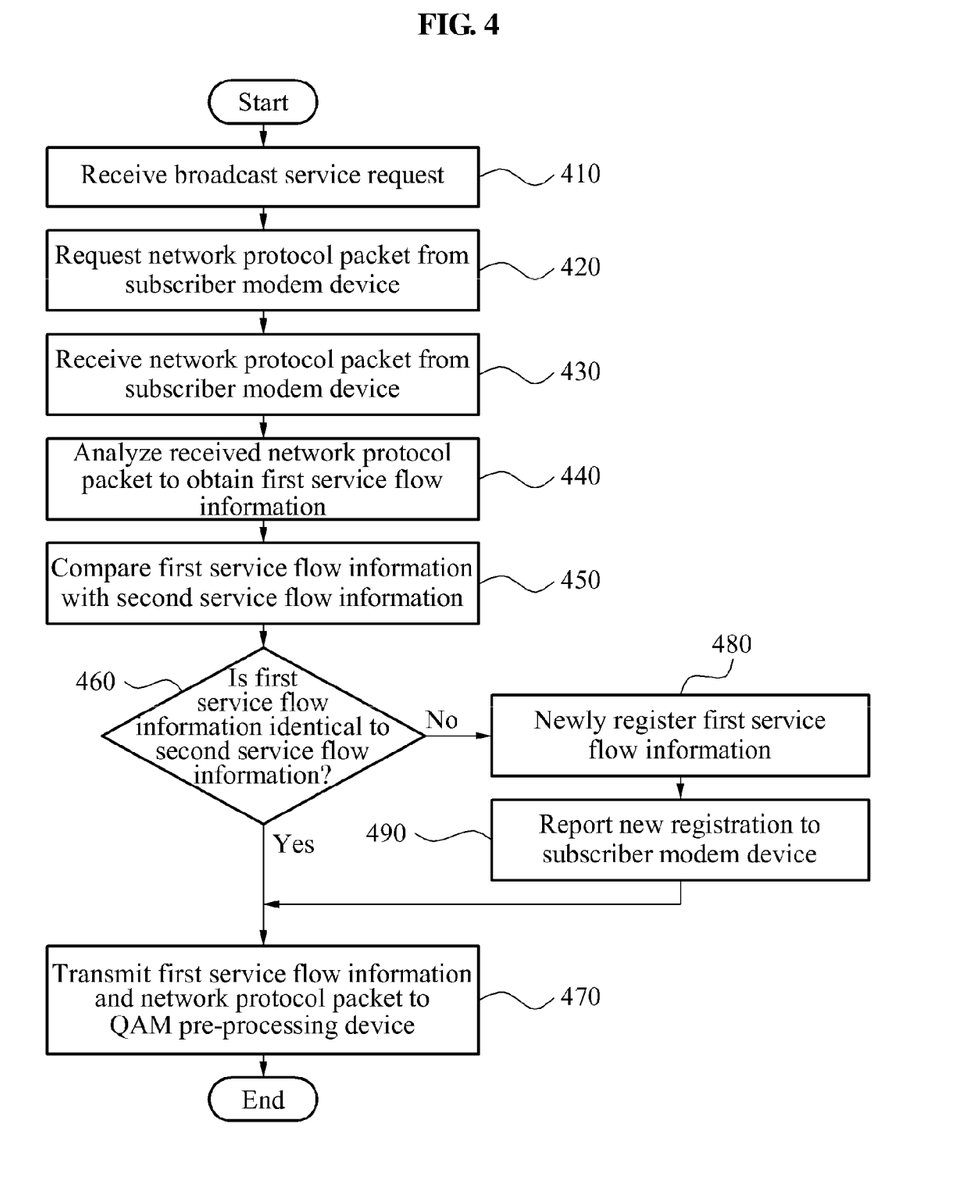
FIG. 4 is a flowchart illustrating an operating method of a cable modem termination device according to an embodiment of the present invention.

FIG. 4 illustrates an operating method of a cable modem termination device according to an embodiment of the present invention. The operating method of FIG. 4 may describe operation 310 of FIG. 3 in detail. A module-type cable modem termination device may be used as the cable modem termination device 301 performing the method of FIG. 4, and may function as a master device that may control and manage operations of the QAM pre-processing device 302.

Referring to FIG. 4, the cable modem termination device 301 receives a broadcast service request from the subscriber modem device 500 in operation 410, and requests a network protocol packet from the subscriber modem device 500 in operation 420. In response to the request, the cable modem termination device 301 receives the network protocol packet from the subscriber modem device 500 in operation 430. In this case, the network protocol packet may be an IGMP join message packet or may be an ARP packet.

The cable modem termination device 301 analyzes the received network protocol packet to obtain first service flow information pre-registered in the subscriber modem device 500 in operation 440.

The cable modem termination device 301 may compare the first service flow information with the second service flow information pre-registered in the cable modem termination device 301 in operation 450, and may determine whether the first service flow information is identical to the second service flow information pre-registered in operation 460. In this case, a plurality of second service flow information corresponding to the subscriber modem device s may be registered in the cable modem termination device 301. Whether second service flow information identical to the first service flow information exists among the plurality of second service flow information is determined in operation 460, and, when the determining determines the second service flow information exists, the first service flow information and the network protocol packet are transmitted to the QAM pre-processing device 302 in operation 470.

When the determining in operation 460 determines that second service flow information identical to the first service flow information does not exist, the cable modem termination device 301 newly registers the first service flow information pre-registered in the subscriber modem device 500 in operation 480 and reports the new registration to the subscriber modem device 500 via a downlink channel in operation 490.

When the new registration is completed, the first service flow information and the network protocol packet are transmitted to the QAM pre-processing device 302 in operation 470. In this case, the cable modem termination device 301 may further transmit a control signal in addition to the first service flow information and the network protocol packet. In this case, the control signal may be a transmission control command commanding to transmit the first service flow information pre-registered in the subscriber modem device 500 and the network protocol packet to the service supply network 200, and may be a data-processing control command commanding to perform data processing. The QAM pre-processing device 302 may be controlled by the transmission control command and the data processing control command.

Figure 5:
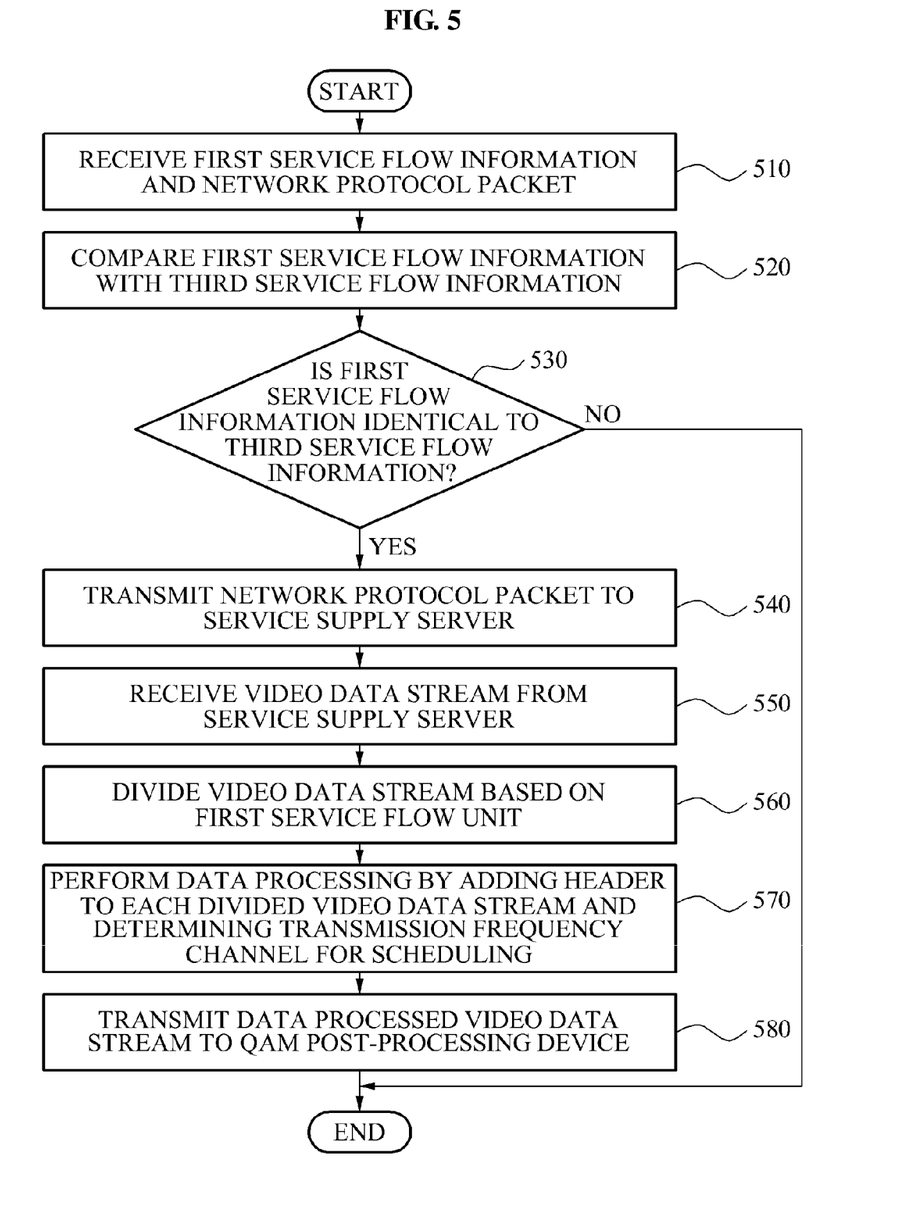
FIG. 5 is a flowchart illustrating an operating method of a QAM pre-processing device according to an embodiment of the present invention.

FIG. 5 illustrates an operating method of a QAM pre-processing device according to an embodiment of the present invention. The method of FIG. 5 describes operations 320 through 340 of FIG. 3 in detail. An edge-type QAM pre-processing device may be used as the QAM pre-processing device performing the method of FIG. 5. The QAM pre-processing device 302 may be a passive peripheral device that may be operated depending on the cable modem terminal device 301.

When the first service flow information pre-registered in the subscriber modem device 500 and the network protocol packet are received from the cable modem termination device 301 in operation 510, the QAM pre-processing device 302 compares the first service flow information with third service flow information pre-registered in the QAM pre-processing device 302 in operation 520, and determines whether the first service flow information is identical to the third service flow information in operation 530. In this case, a plurality of third service flow information corresponding to a plurality of cable modems may be registered in the QAM pre-processing device 302.

When the determining in operation 530 determines that the first flow information is not identical to the third service flow information, the QAM pre-processing device 302 may terminate operations.

Conversely, when the determining in operation 530 determines that the third service flow information identical to the first service flow information exists, the QAM pre-processing device 302 transmits, to the service supply server 100, the network protocol packet via the service supply network 200 in operation 540. Therefore, the service supply server 100 may determine, as a data communication route, the QAM pre-processing device 302 that transmits the first service flow information and the network protocol packet.

When the QAM pre-processing device 302 receives a video data stream via the service supply server 100 in operation 550, the QAM pre-processing device 302 divides the video data stream based on a pre-registered first service flow unit in operation 560.

The QAM pre-processing device 302 performs data-processing of each divided video data stream in operation 570. In this case, a header may be added to each divided video data stream, a transmission frequency channel is determined with respect to each divided video data stream to perform scheduling and thus, the data-processing may be performed. When the data processing is completed, the QAM pre-processing device 302 transmits the video data stream to the QAM post-processing device 303 in operation 580.

As described with reference to FIG. 5, the QAM pre-processing device 302 may perform data processing of a video data stream received from the service supply server 100 and may transmit the data processed video data stream to the subscriber modem device 500. Therefore, the headend system 300 may effectively perform data processing and data transmission.

According to embodiments, a high capacity video data stream may be processed without changing a QAM pre-processing device with a cable modem termination device by determining the QAM pre-processing device as a reception route of a video data stream and by performing data processing in the QAM pre-processing device.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An Internet Protocol (IP) network-based headend system, comprising:
   a cable modem termination device to receive a network protocol packet from a subscriber modem device, and to analyze the received network protocol packet to obtain service flow information pre-registered in the subscriber modem device;
   wherein the cable modem termination device compares the service flow information pre-registered in the subscriber modem device with service flow information pre-registered in the cable modem termination device to determine whether the service flow information pre-registered in the subscriber modem device is identical to the service flow information pre-registered in the cable modem termination device;
   a quadrature amplitude modulation (QAM) pre-processing device to:
      receive the pre-registered service flow information and the received network protocol packet from the cable modem termination device,
      transmit the obtained pre-registered service flow information and the received network protocol packet to a service supply server that is connected based on an IP network, to be determined, by the service supply server, as a data reception route, and receive a video data stream from the service supply server to perform data processing; and
   a QAM post-processing device to receive the data processed video data stream from the QAM pre-processing device to transmit to the subscriber modem device based on the pre-registered service flow information; and
   wherein the cable modem termination device transmits the network protocol packet to the QAM pre-processing device based on determining that the service flow information pre-registered in the subscriber modem device is identical to the service flow information pre-registered in the cable modem termination device.

2. The system of claim 1, wherein the cable modem termination device compares the service flow information pre-registered in the subscriber modem device with service flow information pre-registered in the cable modem termination device to determine whether the service flow information pre-registered in the subscriber modem device is identical to the service flow information pre-registered in the cable modem termination device, and wherein the cable modem termination device newly registers, in the cable modem termination device, the service flow information pre-registered in the subscriber modem device, and reports the new registration to the subscriber modem device based on determining that the service flow information pre-registered in the subscriber modem device is not identical to the service flow information pre-registered in the cable modem termination device.

3. The system of claim 2, wherein the cable modem termination device transmits the network protocol packet and the service flow information pre-registered in the subscriber modem device to the QAM pre-processing device, when the service flow information pre-registered in the subscriber modem device is newly registered in the cable modem termination device.

4. The system of claim 1, wherein the QAM post processing device comprises:
   a Data Over Cable Service Interface Specification (DOCSIS) quadrature amplitude modulator to convert the video data stream received from the QAM pre-processing device into a DOCSIS packet to transmit the DOCSIS packet to the subscriber modem device based on the pre-registered service flow information; and
   a video quadrature amplitude modulator to convert the video data stream received from the QAM pre-processing device into an a Moving Pictures Experts Group 2 transport stream (MPEG-2 TS) format to transmit an MPEG-TS packet to the subscriber modem device based on the pre-registered service flow information.

5. The system of claim 1, wherein the QAM pre-processing device compares the pre-registered service flow information and service flow information pre-registered in the QAM pre-processing device to determine whether the pre-registered service flow information is identical to the service flow information pre-registered in the QAM pre-processing device, and wherein the QAM pre-processing device transmits the network protocol packet to the service supply server based on determining that the pre-registered service flow information is identical to the service flow information pre-registered in the QAM pre-processing device.

6. The system of claim 1, wherein the QAM pre-processing device divides the video data stream received from the service supply server, based on a service flow unit pre-registered in the subscriber modem device to add a header to each divided video data stream, and determines a transmission frequency channel with respect to each divided video data stream to perform scheduling.

7. A QAM pre-processing device, the device comprising: a first receiving unit to receive, from a cable modem termination device, service flow information pre-registered in a subscriber modem device and a network protocol packet;
    a first transmitting unit to transmit the received network protocol packet to a service supply server connected based on an IP network;
    a second receiving unit being determined, by the service supply server, as a data reception route, to receive a video data stream;
    a controller to perform data processing of the received video data stream; and
    a second transmitting unit to transmit the data processed video data stream to the subscriber modem device;
    wherein the controller compares the pre-registered service flow information received by the first receiving unit with service flow information pre-registered in the QAM pre-processing device to determine whether the pre-registered service flow information received by the first receiving unit is identical to the service flow information pre-registered in the QAM pre-processing device, and wherein the controller controls the first transmitting unit to transmit the received network protocol packet to the service supply server based on determining that the pre-registered service flow information received by the first receiving unit is identical to the service flow information pre-registered in the QAM pre- processing device.

8. The device of claim 7, wherein the controller divides the video data stream received from the service supply server, based on a service flow unit pre-registered in the subscriber modem device to add a header to each divided video data stream, and determines a transmission frequency channel with respect to each divided video data stream to perform scheduling.

9. A method of operating an IP network-based headend system, the method comprising:
    receiving a network protocol packet from a subscriber modem device, and analyzing the received network protocol packet to obtain service flow information pre-registered in the subscriber modem device;
    transmitting the pre-registered service flow information and the network protocol packet to a QAM pre-processing device for communicating to a service supply server that is connected based on an IP network, and enabling the IP network-based headend system to be determined as a data reception route;
    performing data processing at the QAM pre-processing device when a video data stream is received from the service supply server; and
    transmitting the data processed video data stream from a QAM post-processing device to the subscriber modem device based on the pre-registered service flow information when the data processed video data stream is received;
    wherein the enabling of the IP network-based headend system to be determined as a data reception route, comprises: comparing the pre-registered service flow information with service flow information pre-registered in the headend system to determine whether the pre-registered service flow information is identical to the service flow information pre-registered in the headend system when the pre-registered service flow information and the network protocol packet are received, and transmitting the network protocol packet to the service supply server where the pre-registered service flow information is determined to be identical to the service flow information pre-registered in the headend system.

10. The method of claim 9, wherein the transmitting of the received data processed video data stream comprises:
    converting the data processed video data stream into a DOCSIS packet to transmit the DOCSIS packet to the subscriber modem device based on the pre-registered service flow information.

11. The method of claim 9, wherein the transmitting of the received data processed video data stream comprises:
    converting the data processed video data stream into an MPEG-2 TS format to transmit the an MPEG-TS packet to the subscriber modem device based on the pre-registered service flow information.

12. The method of claim 9, wherein the performing of the data processing comprises:
    dividing the video data stream received from the service supply server, based on a service flow unit pre-registered in the subscriber modem device to add a header to each divided video data stream, and determining a transmission frequency channel with respect to each divided video data stream to perform scheduling.

\* \* \* \* \*